(12) United States Patent
Goodwin et al.

(10) Patent No.: US 8,572,480 B1
(45) Date of Patent: Oct. 29, 2013

(54) EDITING THE SEQUENTIAL FLOW OF A PAGE

(75) Inventors: Robert L. Goodwin, Mercer Island, WA (US); C. Brandon Forehand, Seattle, WA (US); Keith L. Frost, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 596 days.

(21) Appl. No.: 12/241,352

(22) Filed: Sep. 30, 2008

Related U.S. Application Data

(60) Provisional application No. 61/057,674, filed on May 30, 2008.

(51) Int. Cl.
*G06F 17/00* (2006.01)

(52) U.S. Cl.
USPC .............................. 715/244; 382/173; 715/247

(58) Field of Classification Search
None
See application file for complete search history.

(56) References Cited

U.S. PATENT DOCUMENTS

| | | | |
|---|---|---|---|
| 4,741,045 A | 4/1988 | Denning | |
| 4,754,489 A | 6/1988 | Bokser | |
| 5,029,107 A | 7/1991 | Lee | |
| 5,285,526 A | 2/1994 | Bennett et al. | |
| 5,465,304 A | 11/1995 | Cullen et al. | |
| 5,590,257 A | 12/1996 | Forcier | |
| 5,671,438 A | 9/1997 | Capps et al. | |
| 5,774,580 A | 6/1998 | Saitoh | |
| 5,778,103 A | 7/1998 | Allan et al. | |
| 5,784,487 A | 7/1998 | Cooperman | |
| 5,802,533 A | 9/1998 | Walker | |
| 5,850,490 A | 12/1998 | Johnson | |

(Continued)

FOREIGN PATENT DOCUMENTS

| | | |
|---|---|---|
| EP | 1343095 A2 | 9/2003 |
| JP | 07-192084 A | 7/1995 |

(Continued)

OTHER PUBLICATIONS

Malerba, Donato, et al.; Correcting the Document Layout: A Machine Learning Approach; 2003; Proceedings of the Seventh Int'l Conference on Document Analysis and Recognition, pp. 1-6.*

(Continued)

*Primary Examiner* — Stephen Hong
*Assistant Examiner* — Asher Kells
(74) *Attorney, Agent, or Firm* — Knobbe Martens Olson & Bear LLP

(57) ABSTRACT

Editing the sequential flow of objects of a page is disclosed. The objects may have intended correct sequential order for processing or viewing, which may be difficult to detect by a computer algorithm. An initial flow may be created using an initial flow algorithm to provide an initial order of the objects. The initial flow may be visually represented on a page, such as by a curve drawn through the objects. A human editor may reorder the objects if the initial flow is not correct. In some aspects, the editor may trace a new order of the objects by controlling an input device to sequentially order the objects in an editor-assigned flow. In other aspects, the editor may sequentially select objects to create the editor-assigned flow. In response to the editor-assigned flow, a validation flow may be created, which may assist the editor in confirming accuracy of the edited flow. In other aspects, heuristics may learn from the editor-assigned flow to improve the initial flow over time.

25 Claims, 9 Drawing Sheets

(56) References Cited

U.S. PATENT DOCUMENTS

| | | | |
|---|---|---|---|
| 5,860,074 A | 1/1999 | Rowe et al. | |
| 5,907,631 A | 5/1999 | Saitoh | |
| 5,978,819 A | 11/1999 | Berstis | |
| 6,002,798 A | 12/1999 | Palmer et al. | |
| 6,032,163 A | 2/2000 | Tou et al. | |
| 6,256,610 B1 | 7/2001 | Baum | |
| 6,269,188 B1 | 7/2001 | Jamali | |
| 6,298,357 B1 | 10/2001 | Wexler et al. | |
| 6,377,704 B1 | 4/2002 | Cooperman | |
| 6,487,570 B1 | 11/2002 | Forcier | |
| 6,510,243 B1 | 1/2003 | Ikeda | |
| 6,562,077 B2 | 5/2003 | Bobrow et al. | |
| 6,766,495 B1 | 7/2004 | Bates et al. | |
| 6,915,484 B1 | 7/2005 | Ayers et al. | |
| 6,956,587 B1 | 10/2005 | Anson | |
| 6,978,046 B2 | 12/2005 | Robinson et al. | |
| 7,171,061 B2 | 1/2007 | Sarkar et al. | |
| 7,213,035 B2 | 5/2007 | Ornstein et al. | |
| 7,219,309 B2 | 5/2007 | Kaasila et al. | |
| 7,272,258 B2 | 9/2007 | Berkner et al. | |
| 7,362,311 B2 | 4/2008 | Filner et al. | |
| 7,392,472 B2 | 6/2008 | Simard et al. | |
| 7,412,647 B2 | 8/2008 | Sellers et al. | |
| 7,433,548 B2 | 10/2008 | Goodwin et al. | |
| 7,460,710 B2 | 12/2008 | Coath et al. | |
| 7,469,388 B1 | 12/2008 | Baudisch et al. | |
| 7,486,628 B1 | 2/2009 | Brisebois et al. | |
| 7,870,503 B1 * | 1/2011 | Levy et al. | 715/783 |
| 7,899,249 B2 | 3/2011 | Furmaniak et al. | |
| 2002/0052898 A1 | 5/2002 | Schlit et al. | |
| 2002/0191847 A1 | 12/2002 | Newman et al. | |
| 2003/0014445 A1 | 1/2003 | Formanek et al. | |
| 2003/0126558 A1 | 7/2003 | Griffin | |
| 2003/0128234 A1 | 7/2003 | Brown et al. | |
| 2003/0135649 A1 | 7/2003 | Buckley et al. | |
| 2003/0231219 A1 * | 12/2003 | Leung | 345/863 |
| 2004/0004641 A1 | 1/2004 | Gargi | |
| 2004/0103371 A1 | 5/2004 | Chen et al. | |
| 2004/0139384 A1 | 7/2004 | Lin | |
| 2004/0146199 A1 | 7/2004 | Berkner et al. | |
| 2004/0202352 A1 | 10/2004 | Jones | |
| 2004/0205568 A1 | 10/2004 | Breuel et al. | |
| 2005/0125549 A1 | 6/2005 | Katayama | |
| 2005/0128516 A1 | 6/2005 | Tomita | |
| 2005/0234893 A1 | 10/2005 | Hirsch | |
| 2006/0005116 A1 | 1/2006 | Ferguson et al. | |
| 2006/0181742 A1 | 8/2006 | Lech et al. | |
| 2006/0227153 A1 | 10/2006 | Anwar et al. | |
| 2006/0271847 A1 * | 11/2006 | Meunier | 715/517 |
| 2006/0282838 A1 | 12/2006 | Gupta et al. | |
| 2006/0288278 A1 * | 12/2006 | Kobayashi | 715/523 |
| 2006/0288279 A1 * | 12/2006 | Yacoub et al. | 715/530 |
| 2007/0061704 A1 | 3/2007 | Simova et al. | |
| 2007/0112810 A1 | 5/2007 | Johnson | |
| 2007/0208996 A1 * | 9/2007 | Berkner et al. | 715/521 |
| 2007/0234203 A1 | 10/2007 | Shagam et al. | |
| 2008/0037873 A1 * | 2/2008 | Berkner et al. | 382/176 |
| 2008/0267535 A1 | 10/2008 | Goodwin et al. | |
| 2009/0087094 A1 * | 4/2009 | Deryagin et al. | 382/180 |

FOREIGN PATENT DOCUMENTS

| | | |
|---|---|---|
| JP | 2004005453 A | 1/2004 |
| JP | 2004532430 T | 10/2004 |
| WO | WO 02/089105 A2 | 11/2002 |

OTHER PUBLICATIONS

Boychuk, B., Shortcovers for iPhone Review, Macworld.com, http://www.macworld.com/article/141540/2009/07/shortcovers.html, Jul. 6, 2009, pp. 3.

Breuel, T.M., et al., Reflowable Document Image, Chapter 1, pp. 1-14, (http://citeseerx.ist.psu.edu/viewdoc/download?doi=10.1.1.12.9828&rep=rep1&type=pdf) [retrieved on Nov. 17, 2010], Nov. 18, 2002.

Cattoni, R., et al., Geometric Layout Analysis Techniques for Document Image Understanding: A Review, Retrieved from the Internet: URL:http://tev.itc.it/people/modena/Papers/DOC_SEGstate.pdf [retrieved on Jan. 29, 2003, 1998.

Lin, X., Header and Footer Extraction by Page-Association, Hewlett-Packard Company, May 6, 2002, pp. 1-8, Palo Alto, California, U.S.

Montanés, E., et al., Towards Automatic and Optimal Filtering Levels for Feature Selection in Text Categorization, Advances in Intelligent Data Analysis VI, Sep. 2005, pp. 239-248.

PDF Reference Fifth Edition, Adobe Portable Document Format Version 1.6, Chapter 5.9, Adobe Systems Incorporated, 1985-2004, pp. 440-446.

Taghva et al., The Impact of Running Headers and Footers on Proximity Searching, Information Science Research Institute, University of Nevada, 2004, pp. 5, Las Vegas, Nevada, U.S.

* cited by examiner

US 8,572,480 B1

EDITING THE SEQUENTIAL FLOW OF A PAGE

RELATED APPLICATIONS

This application claims priority to U.S. Provisional Patent Application No. 61/057,674 to Goodwin et al., entitled "Editing the Sequential Flow of a Page", filed May 30, 2008 and incorporated herein by reference.

BACKGROUND

Content is increasingly being distributed in electronic form to an array of users for use on computing devices. Content may include traditional media such as books, magazines, newspapers, newsletters, manuals, guides, references, articles, reports, documents, etc. The content may exist in print and/or in electronic form, or may be transformed from print to an electronic form through the use of an imaging device. Additionally, as more content is transformed from print to electronic form, more images of content are becoming available online. In some instances, an image may be formatted to replicate a page of content as it would appear in print.

Content often includes formatting which is difficult or impossible to detect by computer algorithms. For example, content may include an intended order of sections or symbols which may be obvious or intuitive to a human reader, but unable to be consistently detected by an algorithm. For example, multi-column text, text with various headers, or other formatted text may have an intended order which is not easily detectable by a computer algorithm.

In some instances, human editors may assist in formatting content. For example, a human editor may review each page of a scanned book to verify an assigned format, which may be a time consuming and tedious editing process. It is often advantageous to minimize human interaction during an editing process to increase efficiency while maximizing accuracy of the editing process.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

The disclosure describes techniques for editing a sequential flow of letters, characters, symbols, numbers, formulas, graphics, line drawings, table borders, images, textual content, or other objects, that may be used to represent information in a page.

A process of modifying an image-based file for presentation may include various operations. In one or more embodiments, an optical character recognition (OCR) device may be used to create or modify the image-based file. The OCR device may be used to identify objects as zones of a page in addition to the more traditional purpose of identifying specific characters, etc., for an image-to-text conversion. Computer implemented algorithms and human editors may manipulate the image-based file such that the file may be represented on a second medium in a manner consistent with an original representation. For example, a page of a book may be scanned by an OCR device to create the image-based file, which may then be edited by human editors and computer algorithms to produce a reflowable image-based file for viewing on a display device. A reflowable image-based file is one that permits lines of objects to vary in presentation by modifying a line, a column, and a page distribution for an object in a "reflow" according to the given dimensions and limitations of a selected output medium, such as the size of a display or window. The image-based file is configured to automatically adapt itself to be rendered on various output media, such as various sized displays and windows on electronic media and/or printed media.

Generally speaking, the flow editing techniques disclosed herein may enable presentation of the image-based file including objects, such as text, while preserving an intended flow of the text from the original presentation, such as the scanned version of a printed document. For example, the image-based file may contain multiple objects which are intended to be viewed sequentially on a page. A reflowable image-based file may maintain the object flow as selected during a flow editing process despite a presentation display size or format constraints of a document. The term "document" may include electronic and/or fixed medium collections of images, such as text, and may be compiled as a book, magazine, advertisement, newspaper, newsletter, manual, guide, reference, article, report, and any other communication medium for exchanging messages using visual means.

For purposes of discussion, editing the sequential flow of a page is described in the context of editing a flow of a page of text in an image-based file. One illustrative implementation of this context is provided below. However, it should be appreciated that the described editing flow techniques may be implemented in other contexts. Moreover, other flow editing techniques may be performed by the illustrated architecture.

Illustrative System Architecture

Figure 1A:
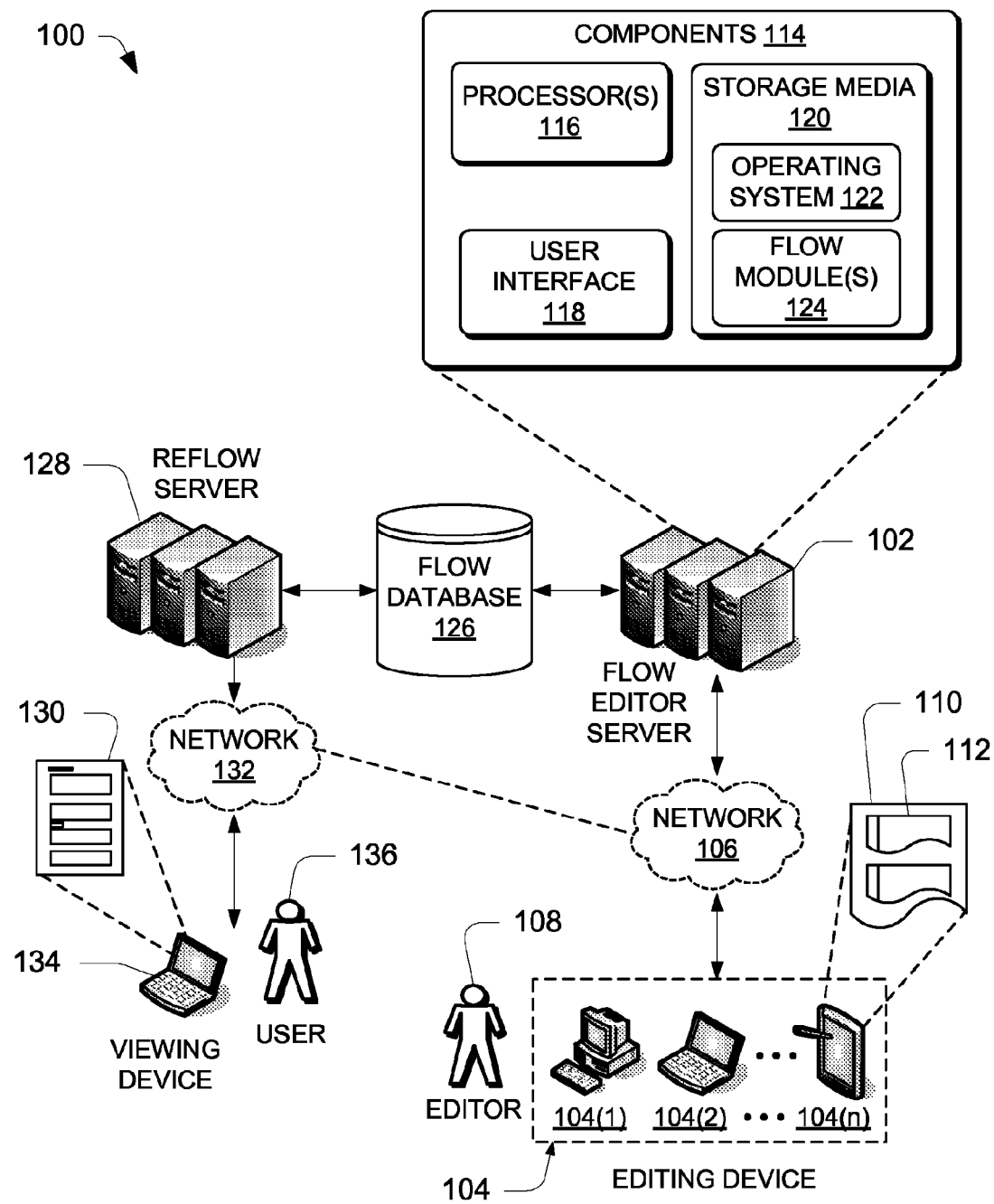
FIG. 1A shows an illustrative computing environment in which one or more embodiments of editing the sequential flow of a page of content may be implemented.

FIG. 1A shows an illustrative computing environment 100 in which one or more embodiments of editing the sequential flow of a page may be implemented. The environment 100 includes a flow editor server 102 and an editing device 104 communicatively connected by a network 106. The editing device 104 may receive input from an editor 108. For example, the editor 108 may be a human editor that edits an image-based file (or simply "page") 110 using the editing device 104. In one or more embodiments, the editing device 104 is configured to receive the page 110 from the flow editor server 102 via the network 106, and to render the page 110 on an output device, such as a display screen. The page 110 includes objects 112, such as paragraphs of text, headers, sidebars, or other collections of characters, symbols, etc.

The editing device 104 may include a number of possible editing devices 104(1), 104(2), . . . , 104(n). For example, the editing device 104(1) may be a desktop computer and the editing device 104(2) may be a portable computer, each having respective user control devices such as a touchpad, mouse, track ball, keyboard, voice recognition commands, and the like. In some embodiments, the editing device 104(n) may be a touch screen-enabled device (e.g., a tablet computer, personal data assistant (PDA), etc.) which enables the editor 108 to input data by touching a display. For example, the editor 108 may input data by touching the display of the editing device 104(n) with the editor's finger, a stylus, or other input device. A touch screen may advantageously enable the editor 108 to intuitively interact with the editing device 104(n) with minimal training, thus reducing the learning associated with operation of the editing device. In other embodiments, the editor device 104 may be a specialized computing device for editing the sequential flow of a page. For example, the specialized computing device may only include limited controls which are necessary for the editor 108 to perform any necessary functions.

In accordance with one or more embodiments, the editing device 104 may include a browser or other user interface which enables the editor 108 to interact with the flow editor server 102 via a web-based application. In this configuration, the editing device 104 may not require customized software (e.g., modules, applications, etc.), but instead may access modules from the flow editor server 102 via the network 106. In additional embodiments, the editing device 104 may include local versions of the modules included in the flow editor server 102, as described below.

The network 106 in FIG. 1A may be a local area network ("LAN"), a larger network such as a wide area network ("WAN"), or a collection of networks, such as the Internet. Protocols for network communication, such as TCP/IP, are well known to those skilled in the art of computer networks and may be used to implement the network connections described herein. Persons of ordinary skill in the art will recognize that the systems and methods disclosed herein may also be used in other interactive environments, such as local or wide area networks that connect servers storing related documents and associated files, scripts, and databases, or broadcast communication networks that include set-top boxes or other information appliances providing access to audio or video files, documents, scripts, databases, etc. Although embodiments are described herein as using a network such as the Internet, other distribution means are contemplated that transmit information via memory cards, flash memory, or other portable storage devices.

In accordance with one or more embodiments, the flow editor server 102 may include a number of components 114 for editing the sequential flow of a page. The flow editor server 102 may include greater or fewer components than those shown in FIG. 1A. The components 114 include one or more processors 116, a user interface (UI) 118, and storage media 120, all communicatively connected to each other. The UI 118 represents any devices and related drivers that enable the flow editor server 102 to receive input from a user (e.g., the editor 108) or other system, and to provide output to the user or other system. Thus, to receive inputs, the UI 118 may include keyboards or keypads, mouse devices, touch screens, microphones, speech recognition packages, imaging systems, or the like. Similarly, to provide outputs, the UI 118 may include speakers, display screens, printing mechanisms, or the like.

The flow editor server 102 may include one or more instances of a computer-readable storage media 120 that are addressable by the processor 116. As such, the processor 116 may read data or executable instructions from, or store data to, the storage media 120. The storage media 120 may contain an operating system 122 and one or more flow modules 124, which may be implemented as one or more software modules that, when loaded into the processor 116 and executed, cause the flow editor server 102 to perform any of the functions described herein, such as to enable editing the sequential flow of a page in accordance with embodiments of the present disclosure. Additionally, the storage media 120 may contain implementations of any of the various software modules described herein.

In accordance with an embodiment, the flow editor server 102 is communicatively coupled to a flow database 126. The flow editor server 102 may communicate or otherwise provide edited flow data to a reflow server 128 via a network and/or the flow database 126. In some embodiments, the flow editor server 102 may store the edited flow data in the flow database 126. The reflow server 128 may retrieve the edited flow data and incorporate it in a reflowable image-based file 130 which may be transmitted via a network 132 to a viewing device 134 for display to a user 136. Alternatively or additionally, the reflowable image-based file 130 may be stored on a portable or fixed local storage device (e.g., a hard disk, flash memory, etc.) for retrieval by the viewing device 134. The network 132 may be similar to the network 106 which is described above. In an example, the viewing device 134 may be an electronic book reader, web-enabled device, etc., and may render the reflowable image-based file 130 on a display for viewing by a user 136.

Figure 1B:
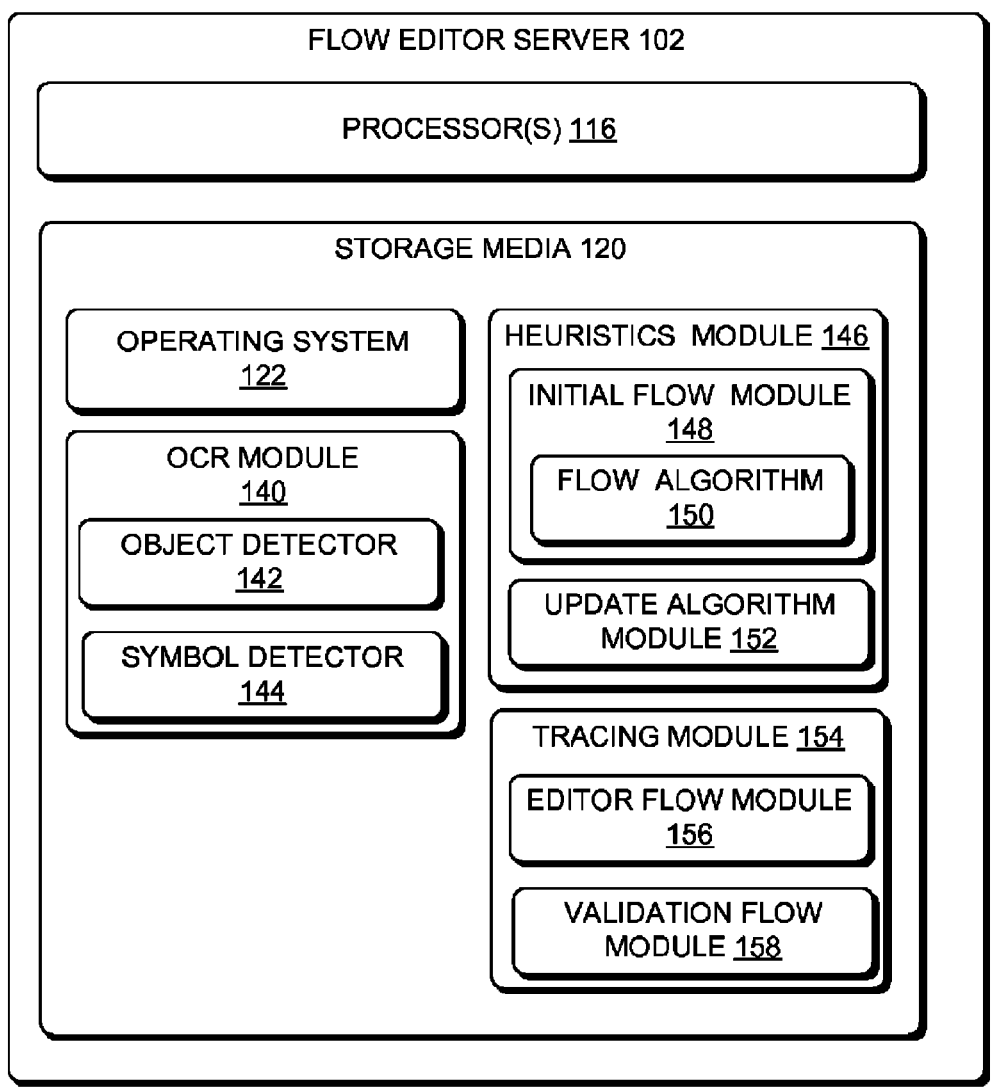
FIG. 1B is a block diagram illustrating one or more embodiments of modules associated with a flow editor server of the computing environment of FIG. 1A.

FIG. 1B is a block diagram illustrating one or more embodiments of a collection of modules 138 associated with the flow editor server 102 of FIG. 1A. As discussed above, the flow editor server 102 includes the processors 116 and storage media 120, which includes the operating system 122 in addition to other flow modules. In accordance with embodiments, the storage media 120 includes an OCR module 140 which may include an object detector 142 and a symbol detector 144. The object detector 142 may enable identification of objects of a page. For example, the object detector 142 may detect a paragraph of text, which may be designated as an object, and may have associated information about the object's boundary, size, location, etc. The symbol detector 144 may enable identifying specific characters, etc., for an image-to-text conversion. In some embodiments, the objects of a page may be detected by the object detector 142, which may then be edited by the editor 108 to assign a flow of the objects of a page.

In accordance with one or more embodiments, the storage media 120 may include a heuristics module 146, which may include an initial flow module 148 having a flow algorithm 150, and an update algorithm module 152. The initial flow module 148 may create an initial flow of the order of objects of a page based on the flow algorithm 150. For example, the initial flow module 148 may process information using the flow algorithm 150 and then output a graphical representation to the editor 108, via the editing device 104(1)-(N). The flow algorithm 150 may be a set of static or dynamic logic-based computer instructions that determine the flow of objects of a page based, at least in part, on information received from the OCR Module 140. For example, the flow algorithm 150 may receive data from the object detector 142, such as the boundary, size, and location of objects (among other possible information), and then determine an order of the detected objects.

In some embodiments, the initial flow module 148 may "learn" by employing heuristics which analyze input from the editor 108 to improve the initial flow. For example, heuristics may use machine learning techniques to analyze historical data to improve an initial flow. The flow algorithm 150 may receive data, updates, or configurations from the update algorithm module 152 to improve the output of the initial flow module 148. When the editor 108 edits (i.e., corrects) an initial flow generated by the initial flow module 148, the update algorithm module 152 may recognize a detectable pattern in the editing process, which in turn may prompt an adjustment to the flow algorithm 150 used by the initial flow module. For example, the editor 108 may repeatedly assign a sidebar (small sections of text located in a side margin of a page) to an order value following an adjacent paragraph, whereas the initial flow module 148, via the flow algorithm 150, may incorrectly order the sidebar before the adjacent paragraph. After a predetermined number of iterations (e.g., edits by the editor, page edits, etc.) the update algorithm module 152 may detect a pattern of edits by the editor and update the flow algorithm 150 used by the initial flow module 148. In some embodiments, the update algorithm module 152 may only update the flow algorithm 150 for an edit of a document, such as editing the flow of objects of a book or database of user interface pages, thus enabling the heuristics module 146 to tailor a flow algorithm 150 to a specific document editing project.

In some embodiments, the storage media 120 may include a tracing module 154, which may include an editor flow module 156 and a validation flow module 158. The editor flow module 156 may enable the editor 108 to trace an edited flow when the initial flow module 148 does not correctly order the objects of a page.

The validation flow module 158 may process the information received from the editor flow module 156 to enable the editor 108 to validate the editor-assigned flow, such as by providing a visual representation of the order of objects of a page. In some embodiments, the validation flow module 158 may assign a sequential order to each of the objects. For example, the validation flow module 158 may associate an object location, such as Cartesian coordinate or other coordinate based data to the location of the object. The validation flow module 158 may then determine sequential intersections of objects from the editor-assigned flow received by the editor flow module 156. The sequential intersections of objects may be determined by comparing coordinates associated with the edited flow and the objects. In some embodiments, a time sequence of intersections of the editor-assigned flow and objects may be used to determine the edited sequential flow of objects of a page. Other known techniques of associating boundaries of an object with a flow (e.g., curve drawn over a period of time, etc.) may be used to assign an order, such as a numerical order or other order designation, to each object of a page.

Illustrative Operation

Figure 2:
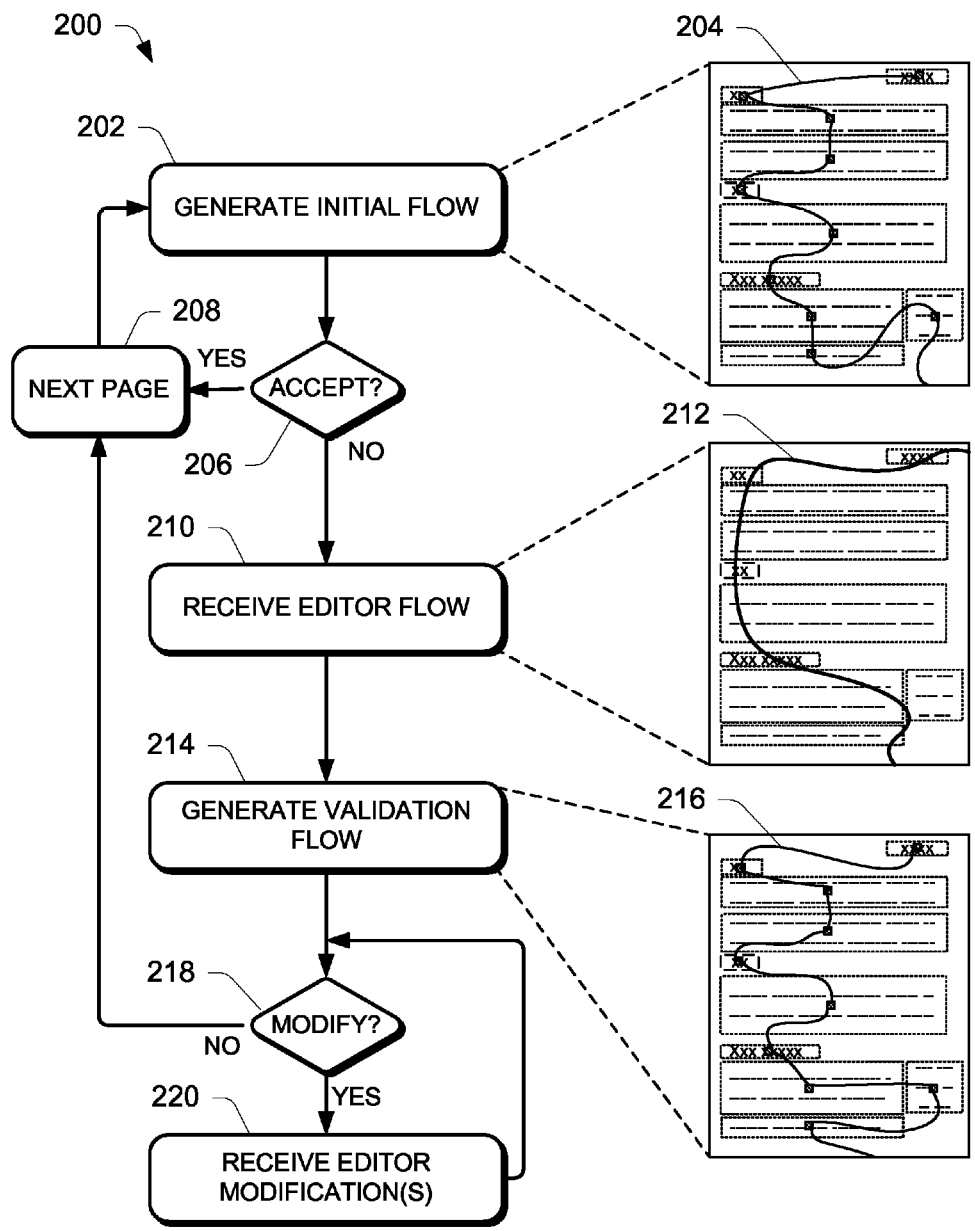
FIG. 2 is a flow diagram of an illustrative process of editing an order of objects of a page of content in accordance with one or more embodiments of the disclosure.

FIG. 2 shows an illustrative process 200 of editing the order of objects of a page of content in accordance with one or more embodiments of the disclosure. The process 200 is illustrated as a collection of blocks in a logical flow graph, which represents a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process 200 is described with reference to the environment 100 of FIG. 1A and the collection of modules 138 of FIG. 1B.

The process 200 may begin at 202 where the flow editor server 102 presents an initial flow 204 to the editor 108, which may be generated by the initial flow module 148. The initial flow 204 is an initial order of objects of a page which may be referred to as a "flow" of objects.

The initial flow 204 may be based on the flow algorithm 150 that may assign an initial order to the objects. For example, the flow algorithm 150 may detect the area of each object of a page and then sequentially assign an order to each object based on a position of the detected area. A first object having an area located near a top of a page may be assigned a lower sequential order than a second object with an area located near the bottom of the page. Similarly, the location of objects may be evaluated from side to side, such that a third object with an area extending furthest to the left may be assigned a lower sequential order than a fourth object with an area that is further to the right of the third object. In some embodiments, the initial flow module 148 may graphically represent the initial flow 204 as a curve drawn through points on the objects of the page, thus enabling the editor 108 to quickly determine if the ordering of objects in the initial flow is correct. In additional embodiments, the initial flow module 148 may graphically number the objects of a page to indicate the initial flow 204.

The flow of objects of a page may appear ambiguous without the benefit of other factors which are not readily accessible (or able to be evaluated) by the flow module(s) 124. For example, common language usage, font, or other cues may assist a reader in determining the intended flow of objects (e.g., headers, paragraph of text, etc. in the context of literature). When viewed only as objects without the benefit of context, objects representing headers, titles, page numbers, sidebar text, multi-column text, etc. may be assigned an incorrect flow by the initial flow module 148 at 202.

At 206, the flow module(s) 124 may enable the editor 108 to accept the initial flow 204 when the initial flow correctly represents an intended flow of the objects of a page. In some embodiments, the flow module(s) 124 may enable the editor 108 to select a "next" command at 208, which when selected by the editor, may result in the flow editor server 102 accepting the initial flow 204 and serving up another page to be analyzed by the editor. Alternatively, the flow module(s) 124 may enable the editor 108 to reject the initial flow 204 as incorrectly representing the intended flow of the objects of a page.

If so, at 210, the editor flow module 156 may enable the editor 108 to create an editor-assigned flow 212. The editor-assigned flow 212 is a user selected assignment of the objects of a page. The editor 108 may create the editor-assigned flow 212 by controlling input devices configured with the editing device 104. For example, the editor 108 may use a mouse, stylus, his or her finger, or other input devices to create a sequential flow of the objects of a page as recognized by a human having the benefit of interpreting cues on the page. At 210, the editor flow module 156 may enable the editor to trace a path through the objects in the same order as the objects are intended to be read, processed, etc. to create the editor-assigned flow 212 of the objects. For example, the editor 108 may click a mouse button to control a pointer located at a start point in the upper right of the page, trace the pointer through each object in the intended order, and end the trace at the bottom of the page to create the editor-assigned flow 212. The editor-assigned flow 212 may be created between mouse clicks or while a mouse button is continually depressed. Similarly, the editor-assigned flow 212 may be created by the editor flow module 156 when a stylus or finger is in contact with a touch screen configured with a touch screen-enabled device such as the editing device 104(n). In additional or alternative embodiments, the editor flow module 156 may enable the editor 108 to click each object of a page in consecutive order to create a sequential order of the objects. For example, the editor 108 may depress a button and touch each object in the intended order to create the sequential order. In some embodiments, the objects may provide a visual indicator that signals when the object has been assigned an order, such as changing a color of the object when the editor traces through the object. The editor flow module 156 may receive the editor-assigned flow 212 at 210, and may store the received editor-assigned flow in memory, such as the storage media 120 and/or the flow database 126.

At 214, the validation flow module 158 may convert the editor-assigned flow 212 into a validation flow 216. The validation flow 216 may provide visual feedback to the editor 108 to confirm that the editor flow module 156 received an intended input from the editor 108 at the operation 210 to order the objects. For example, the editor-assigned flow 212 may be traced through the various portions of objects, such as corners, edges, or midsections, or combinations of the same. In some instances, it may be difficult for the editor to be sure that the editor-assigned flow 212 was traced correctly and accurately reflects the intended order of the objects. To remedy this situation, the validation flow 216 may be displayed as a curve that traces through the objects at a designated object point, such as the center or the object (i.e., centroid) or through another identifiable location in each object. Thus, the validation flow module 158 may create the validation flow 216 as a visual feedback tool to improve accuracy of the editor's creation of the editor-assigned flow 212.

In accordance with some embodiments, at 218, the flow module(s) 124 may enable the editor 108 to accept the validation flow 216 or modify the validation flow. If the editor accepts the validation flow 216 (e.g., selects continue command, etc.), the process 200 may move to another page. In some embodiments, the flow module(s) 124 may enable the editor 108 to select a "next" command at 208, which when selected by the editor, may result in the flow editor server 102 accepting the validation flow 216 and serving up another page to be analyzed by the editor. If the editor decides to modify the validation flow 216, the editor may direct the flow module(s) 124 to make a modification at 220. The flow module(s) may enable the editor to make a modification using a similar or identical process as described for the creating of the editor-assigned flow 212 in the operation at 210, such as by tracing or consecutively selecting objects. In additional or alternative embodiments, the flow module(s) 124 may enable the editor 108 to selectively edit the validation flow 216 to reorder objects that are incorrectly ordered. For example, the editor may retrace a portion of the objects of the page, or may click on an object to re-designate the object's order in a sequence (e.g., via a menu command, dragging operation, etc.). After the flow module(s) 124 receive the modification at 220, the validation flow 216 may be updated and presented to the editor for verification. The editor may continuously modify the validation flow 216 at 220 as necessary. When the modifications are complete, the process 200 may continue by moving to another page at 208.

In accordance with one or more embodiments, the process 200 may be used in other contexts in addition to ordering objects of text in content such as literature. For example, the process 200 may be used to create a tab order for data entry fields in a user interface of computer software or website pages. The process 200 may be used to quickly create an order of any type of object on a page where the editor 108 may drag or consecutively select the objects to create a sequential order or any other desired order.

Illustrative User Interface

Figure 3:
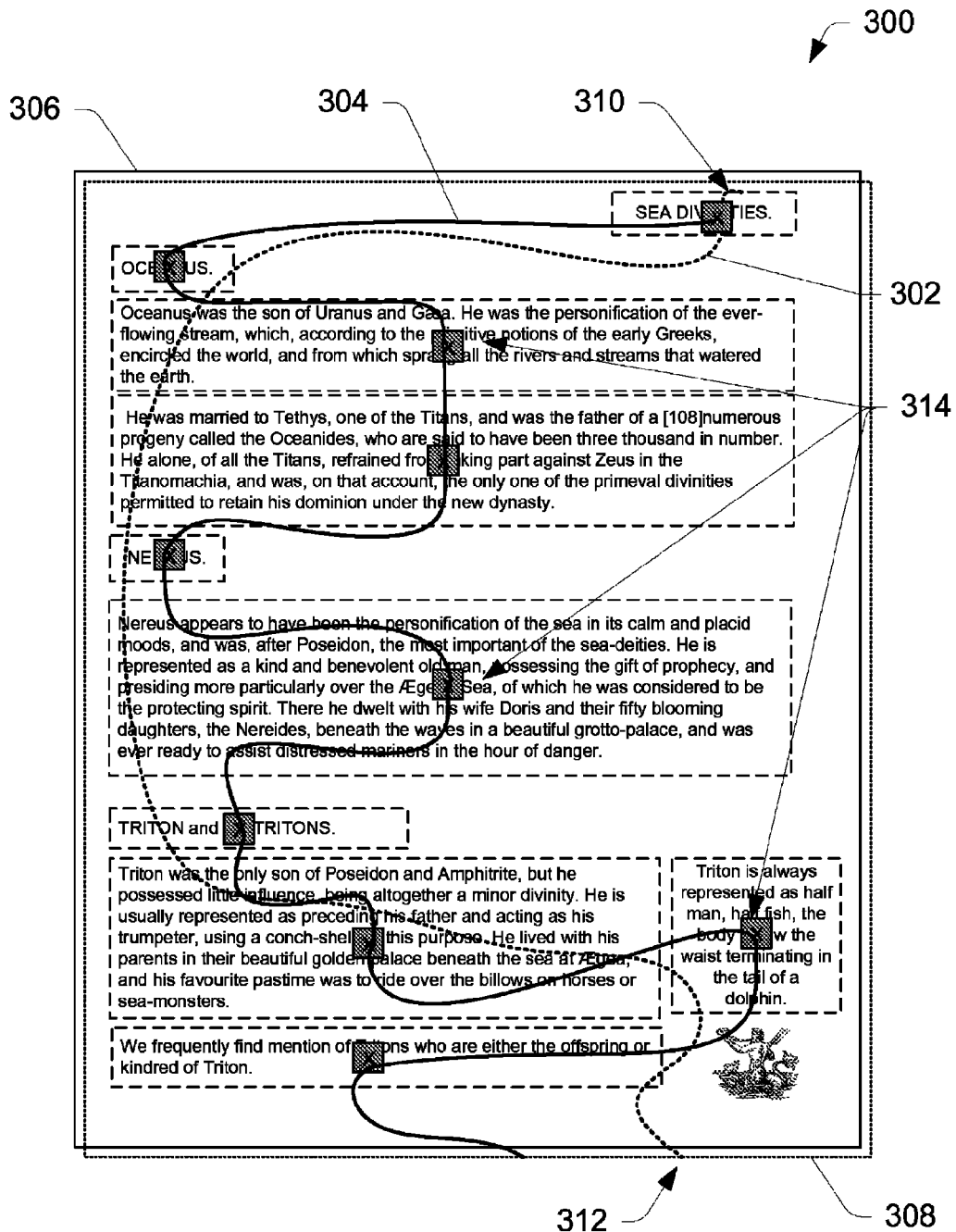
FIG. 3 shows an illustrative edited page having an editor-assigned flow to designate a sequential flow to objects of a page and a validation flow based on the editor-assigned flow in accordance with some embodiments of the disclosure.

FIG. 3 shows an illustrative edited page 300 having an editor-assigned flow 302 and a validation flow 304 in accordance some embodiments of the disclosure. A user interface may be used to display the edited page 300 and may include a first layer 306 that has objects arranged on a page and a second layer 308 which includes flow information to order the objects, such as the editor-assigned flow 302 and the validation flow 304. For example, the first layer 306 may include a page of text having headers and paragraphs while the second layer 308 may include the editor flow 302 traced through the objects to create a sequential order of the objects. In FIG. 3, the second layer 308 is shown with an exaggerated offset from the first layer 306 for illustrative purposes, while from a user perspective, the first layer and second layer may be indistinguishable from one another.

In accordance with some embodiments, the editor 108 may create the editor-assigned flow 302 on the edited page 300 (operation 210 of FIG. 2). For illustrative purposes, the editor-assigned flow 302 is shown in FIG. 3 as a dashed curve. To create the editor-assigned flow 302, the editor 108 may trace the curve through all the objects of a page by beginning at a start point 310 and continuing to an end point 312. The editor may trace the editor-assigned flow 302 using a mouse, a stylus, a finger, or another input device which is recognized by the editing device 104.

In some embodiments, the flow editor server 102 may generate the validation flow 304 (operation 214 of FIG. 2) to provide a visual representation and confirmation of the object flow as intended by the editor. For example, the editor 108 may have to trace between small objects to create the order of the objects and may not be sure if the editor-assigned flow 302 is correct without the visual representation of the validation flow 304. The validation flow 304 may connect points 314 associated with each object of the page. In some embodiments, the points 314 may be located at the center of the objects to create an exaggerated flow for the validation flow 304 that the editor 108 may easily interpret and confirm for accuracy. In other embodiments, the points 314 may be represented at other locations within the objects. Further, in some embodiments, the points 314 may be numbered or sequentially designated in the validation flow 304, which may assist the editor 108 during a modification operation, such as operation 218 of FIG. 2.

In some embodiments, a user interface may enable the editor 108 to access menus to assist in sequentially ordering or modifying the order of the objects. For example, the editor may click a mouse button to display a menu enabling modification of the sequential ordering of objects. An illustrative menu options may include "continue to next page," "continue to same page" (in context of multiple columns), or other menu commands.

The display of points 314 may enable the editor 108 to correct the validation flow 304 when a correction is necessary. The editor may retrace (or consecutively click) a portion of the objects to reorder the portion. For example, the editor may reorder the middle objects by starting at the third object and dragging to the fifth object.

In some situations, the editor may not include an object during a trace when creating the editor-assigned flow 302. For example, the editor may inadvertently miss a header object, a sidebar object, or another object. In some embodiments, the flow editor server 102 may return an error message when all objects are not included in the editor-assigned flow 302. The flow editor server 102 may clear the editor-assigned flow 302, prompt the editor for corrections, highlight unordered objects, or take other actions to indicate to the editor that an object was not included in the sequential order of objects of the page. In some embodiments, the editor may add a missed object without retracing the objects of a page, such as by clicking a menu which facilitates adding the missed object to the sequential order of objects. In further embodiments, the flow editor server 102 may insert the missed object or objects into the sequential order using the flow algorithm 150 in an attempt to correct the editor's mistake without further action by the editor. Finally, the flow editor server 102 may enable the editor to intentionally skip an object, thus enabling some objects to remain without an assigned order.

Figure 4:
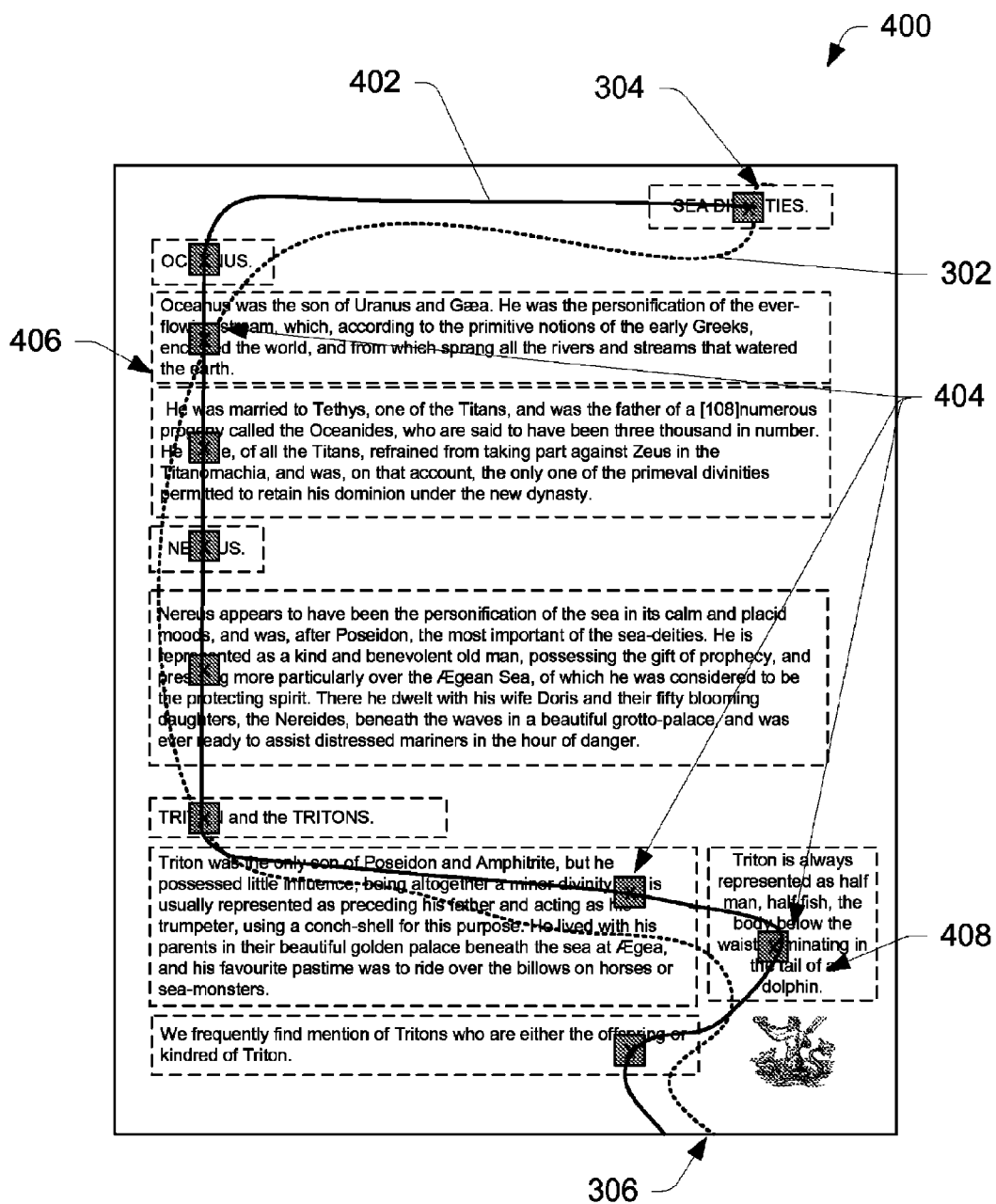
FIG. 4 shows another illustrative edited page having an editor-assigned flow and a validation flow in accordance with one or more embodiments of the disclosure.

FIG. 4 shows another illustrative edited page 400 having the editor-assigned flow 302 and a validation flow 402 in accordance with one or more embodiments of the disclosure. The validation flow 402 may be generated by the validation flow module 158 in response to the editor-assigned flow 302 which is received by the editor flow module 156. The validation flow 402 may be presented by the validation flow module 158 as a best fit curve that connects points 404 associated with each object. The points 404 may be located within each object to accommodate the best fit curve. For example, a straight section 406 may be formed by the flow editor server 102 which may recognize the objects may be directly connected (e.g., ordered) by including a straight line in this section. Similarly, a curved section 408 may include a minimal curve distance of the validation flow 402 which enables inclusion of the objects in this section. The validation flow 402 may closely follow the editor-assigned flow 302, which may provide a quick visual confirmation to the editor that the intended objects have been ordered as intended by the editor. In addition, the validation flow 402 may indicate to the editor a preferred trace path, thus teaching the editor how to trace an efficient path without wasting time making unnecessarily long or time consuming traces.

Figure 5:
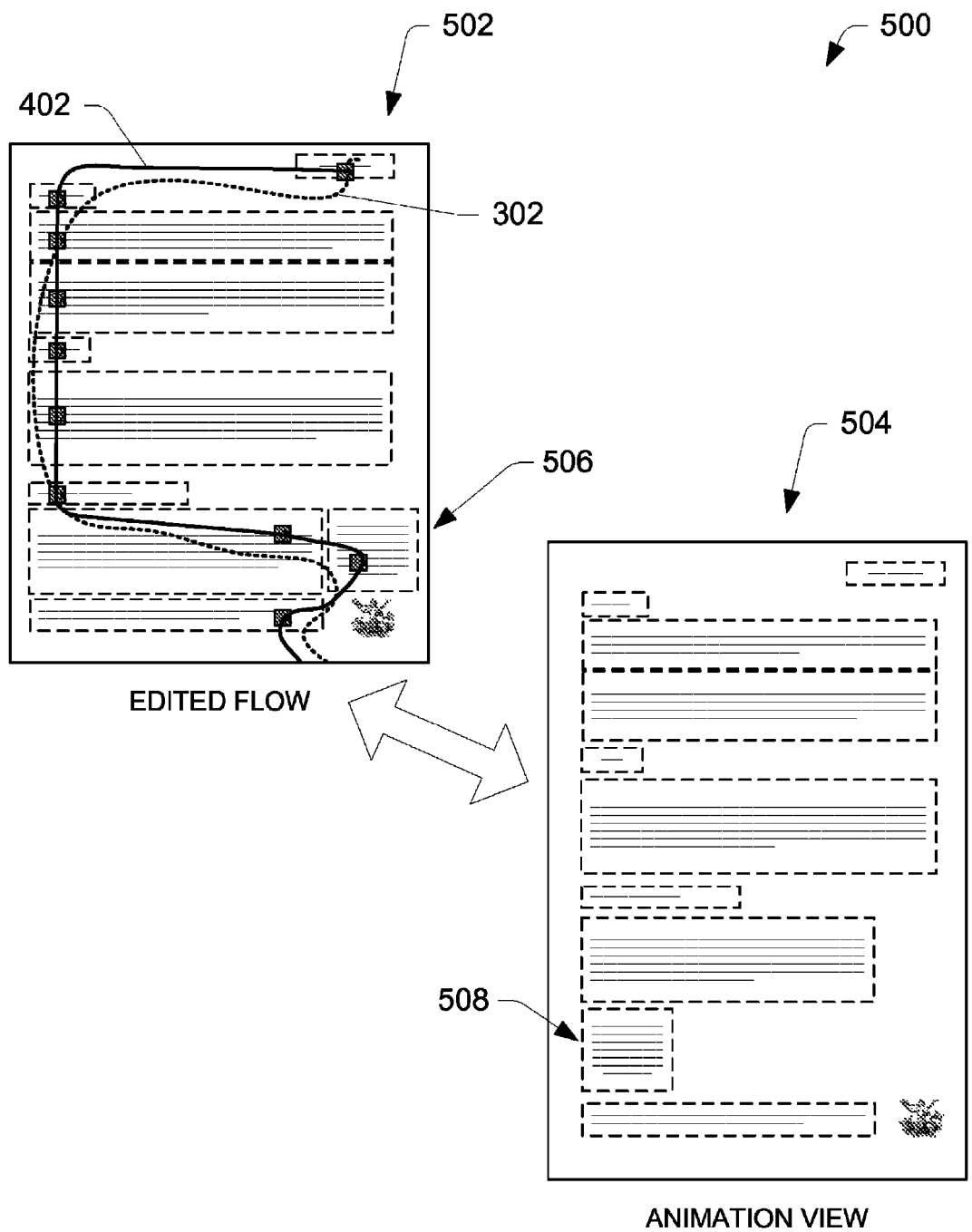
FIG. 5 shows an illustrative visual representation of the order of objects of a page using animation to show a visualization of an editor-assigned flow in accordance with some embodiments of the disclosure.

FIG. 5 shows an illustrative visually representation 500 of the order of objects of a page using animation to show a visualization of an editor-assigned flow in accordance with some embodiments of the disclosure. An edited page 502 having an edited flow, such as the editor-assigned flow 302 and the validation flow 402, may be transformed by animating a shift of the objects in accordance with the designated sequential order, which is determined when the editor accepts the initial flow 204 at the operation 206, selects "next" at the operation 208, and so forth. For example, after the editor 108 creates the editor-assigned flow 302, such as by dragging through the objects, the flow module(s) 124 may create an animation page 504. The animation page 504 may include motion of any objects that are reordered by the editor using the flow module(s) 124. For example, an object 506 (e.g., a sidebar object or other object) in the edited page 502 may be displayed as an animated object 508 using animation to show movement in the animated page 504 to visually indicate to the editor 108 that this object has be assigned to a particular order on the page. Thus, the edited page 502 may transition to the animation page 504 to convey to the editor 108 the effect of an edit by using motion. In some embodiments, the animation page 504 may be displayed on the editing device 104(1)-(N) for a predetermined period of time. In additional embodiments, a display of the animation page 504 may be automatically followed by a presentation of a new page for editing by the editor 108 if no action is taken after a second predetermined period. For example, if the editor does not confirm or reject the animation page 504, another page may be served by the flow editor server 102 to the editing device 104.

In accordance with one or more embodiments, the flow editor server 102 may provide user interfaces that maximize productivity of the editor 108 by minimizing input actions and mental thought processes of the editor 108. For example, the flow modules 124 of the flow editor server 102 may be intuitively understood by the editor such that little or no training is necessary for the editor to conduct his or her editing role. In addition, the commands necessary by the editor may be minimized to remove any time consuming action. For example, additional or unnecessary inputs (e.g., clicks on a mouse), menu selections, precise movements, or the like will require additional time for the editor 108 to edit objects of a page. When all of the pages of a large book must be edited, small reductions in time of the editing process per page may have significant benefits when measured over the duration of the editing of the book. Therefore, one or more embodiments of the flow modules 124 may minimize editor actions by enabling the editor to quickly select the order of objects of a page by one or more simple traces over the page.

Illustrative Operation

Figure 6:
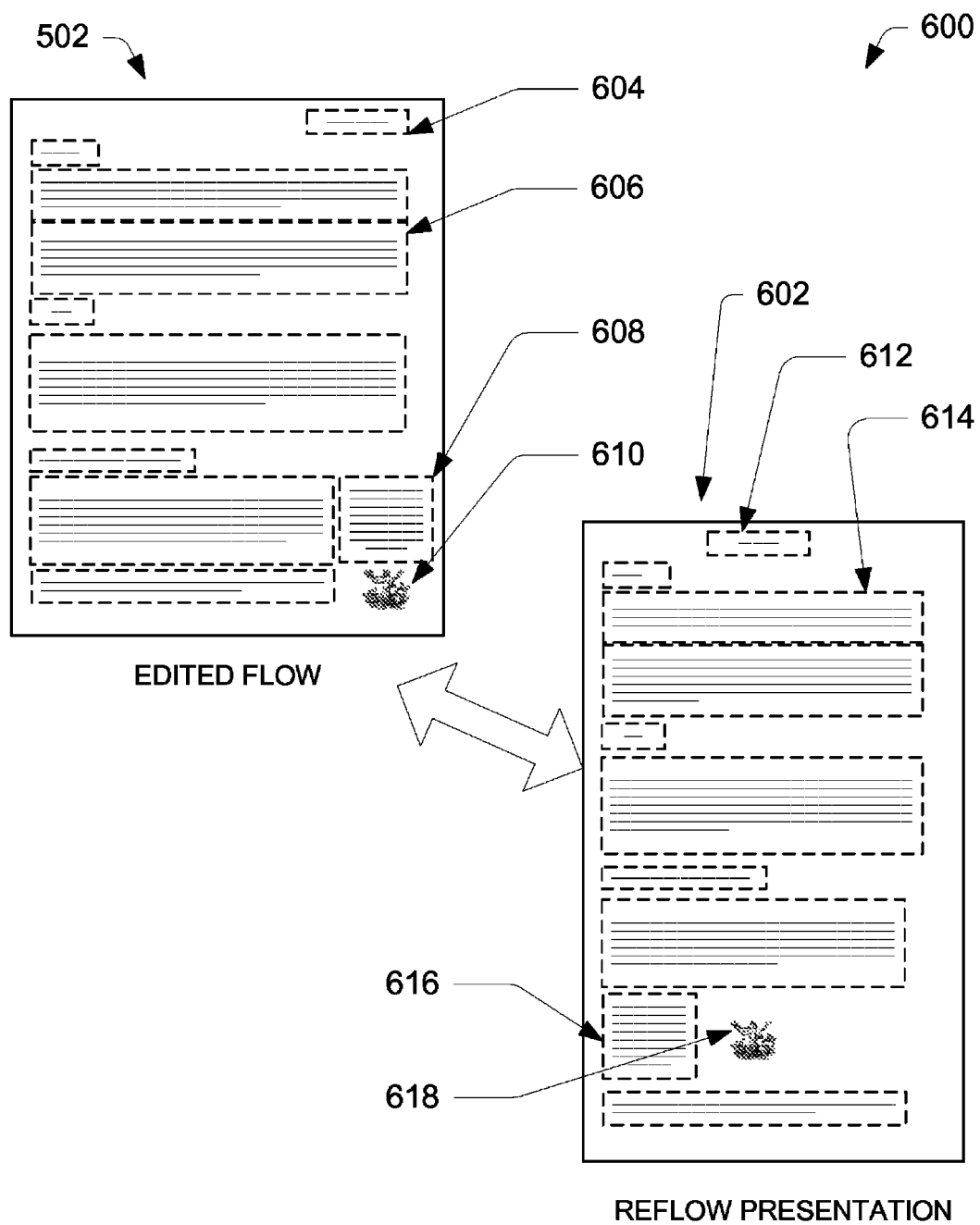
FIG. 6 shows an additional illustrative visual representation of the order of objects of a page that may be displayed to a user as a reflowed presentation via a viewing device in accordance with one or more embodiments of the disclosure.

FIG. 6 shows an additional illustrative visual representation 600 of the edited page 502 and a reflow presentation 602 that may be displayed to the user 136 via the viewing device 134 in accordance with one or more embodiments of the disclosure. The reflow presentation 602 is the display of the ordered objects, as edited by the editor, for viewing by the user 136 on the viewing device 134 as shown in FIG. 1A.

The edited flow 502 may include a header 604, body paragraphs 606, a sidebar 608 and an image 610, among other possible objects. As shown in the edited flow 502, the sidebar 608 is located on the right side of the page in the formatting of the edited flow. The edited flow 502 may be designed for a layout with a predetermined size, such a standard sized book or other content.

The reflow presentation 602 may be the reflowable image-based file 132 of FIG. 1A. The reflow presentation 602 may include the format of a display of the viewing device 134, such as an e-book, PDA, mobile telephone, portable computer, or other viewing device. The reflow presentation 602 may include presentation dimensions that are different than the edit flow 502. For example, the reflow presentation 602 may have a longer and narrower presentation than the presentation of the edited flow 502. Because of the variance of dimensions, the ordered objects of the edited flow 502 may be displayed differently on the reflow presentation 602, while maintaining the edited sequential flow of objects of a page. Thus, the header 604 may be presented at a header location 612 on the reflow presentation 602, while the paragraphs 606 may include a reduced width 614. The sidebar 608 may be placed in-line with the paragraphs at a sidebar location 616 and the image 610 may be in adjacently located at an image location 618, which is consistent with the edited sequential flow of the edited flow 502.

Figure 7:
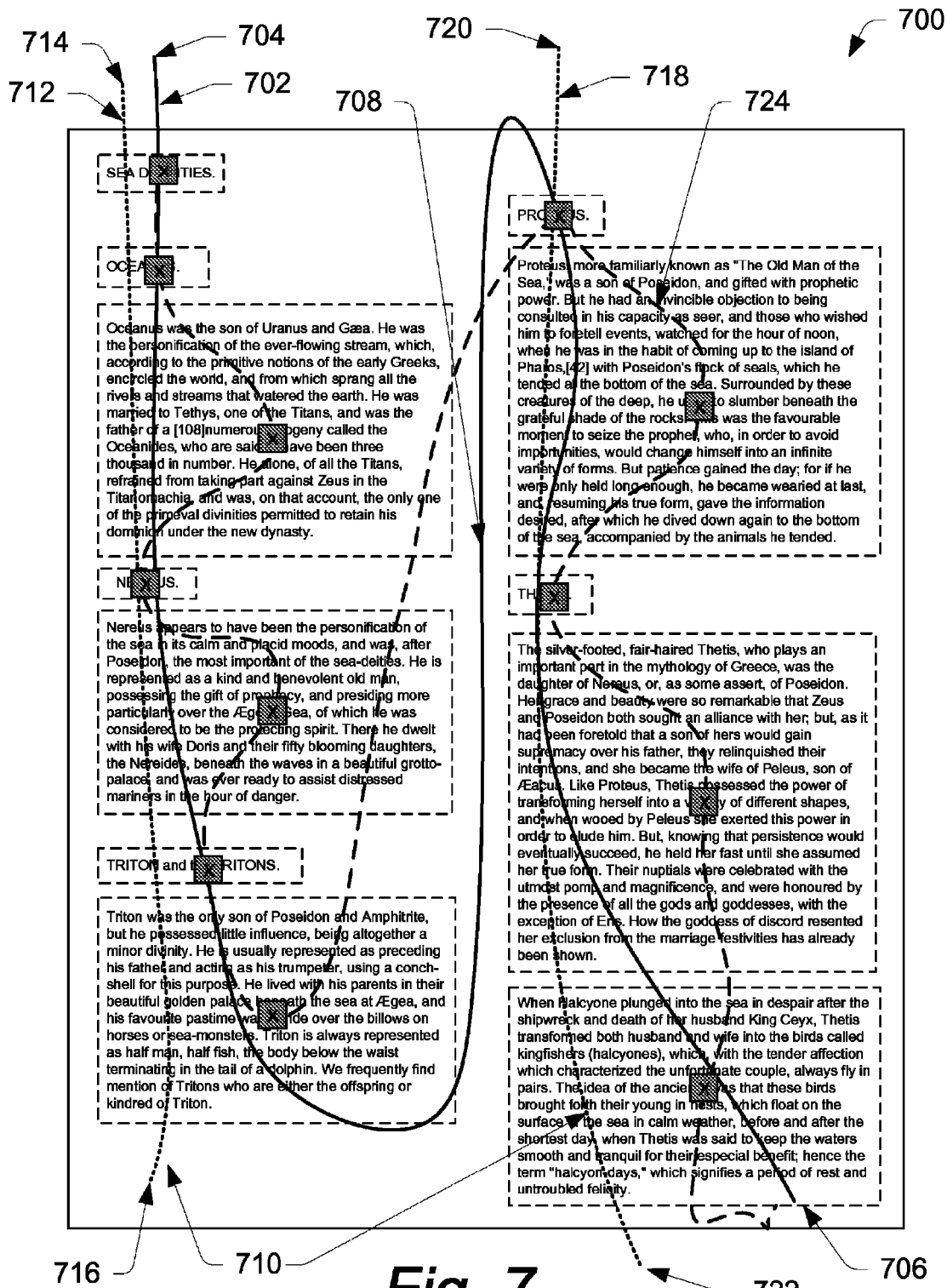
FIG. 7 shows an illustrative edited page using multi-flow entries from an editor in accordance with some embodiments of the disclosure.

FIG. 7 shows an illustrative edited page 700 using multiple editor-assigned flows from an editor in accordance with some embodiments of the disclosure. As described with reference to FIG. 2 and FIG. 3, the editor 108 may trace the order of objects of a page using a mouse, stylus, finger, or other tracing device to create an editor-assigned flow 702. The editor-assigned flow may include a start point 704 and an end point 706. The editor may make a continuous trace between the start point 704 and the end point 706 when tracing the editor-assigned flow 702. Some regions of the editor-assigned flow 702 may be time consuming to trace, such as a region 708. For example, the region 708 may require the editor 108 to use fine motor skills to navigate the tracing device between objects which are in close proximity to one another. Therefore, the region 708 may be difficult or time consuming to trace.

In accordance with one or more embodiments, the edited page 700 may enable multiple traces 710 which may be used to determine an order of objects of a page. The use of multiple traces 710 may enable the editor to skip or avoid the region 708 that is difficult or time consuming to trace by allowing the user to make additional editor-assigned flows that are related to one another such that, in combination, they convey similar information as the editor-assigned flow 702. As such, the editor-assigned flow 702 may be substituted by using multiple traces 710 including for example a first editor-assigned flow 712 and a second editor-assigned flow 718, as described below.

The first editor-assigned flow 712 may include a first flow start 714 and a first flow end 716. The first editor-assigned flow 712 may be quickly traced by dragging a mouse, stylus, finger, or other tracing device from the first flow start 714 to the first flow end 716, in a relatively direct manner. Next, the editor 108 may trace the second editor-assigned flow 718 which includes a second flow start 720 and a second flow end 722. In some embodiments, the editor 108 may select a command to communicate to the flow editor server 102 that the editor intends to create the second editor-assigned flow 718. Alternatively or additionally, the flow editor server 102 may automatically detect the second editor-assigned flow 718 by detecting a second engagement of a tracing device against a touch screen-enabled computing device, a second click of a mouse button, or by other similar techniques.

One or more modules may construct the sequential order of the objects of a page by linking the first flow end 716 and the second flow start 720 to create a final editor-assigned flow that may be used to create the validation flow 724 by the validation flow module 158. Similarly, the validation flow 724 may be generated based on the order of the objects from the editor-assigned flow 702. In some instances, the multiple traces technique may enable the editor 108 to edit sequential flow of objects of a page more quickly than the editor 108 may trace the editor-assigned flow 702, thus enabling the editor 108 to reduce editing time before moving to a new page, which may be presented to the editor by the flow editor server 102.

Figure 8:
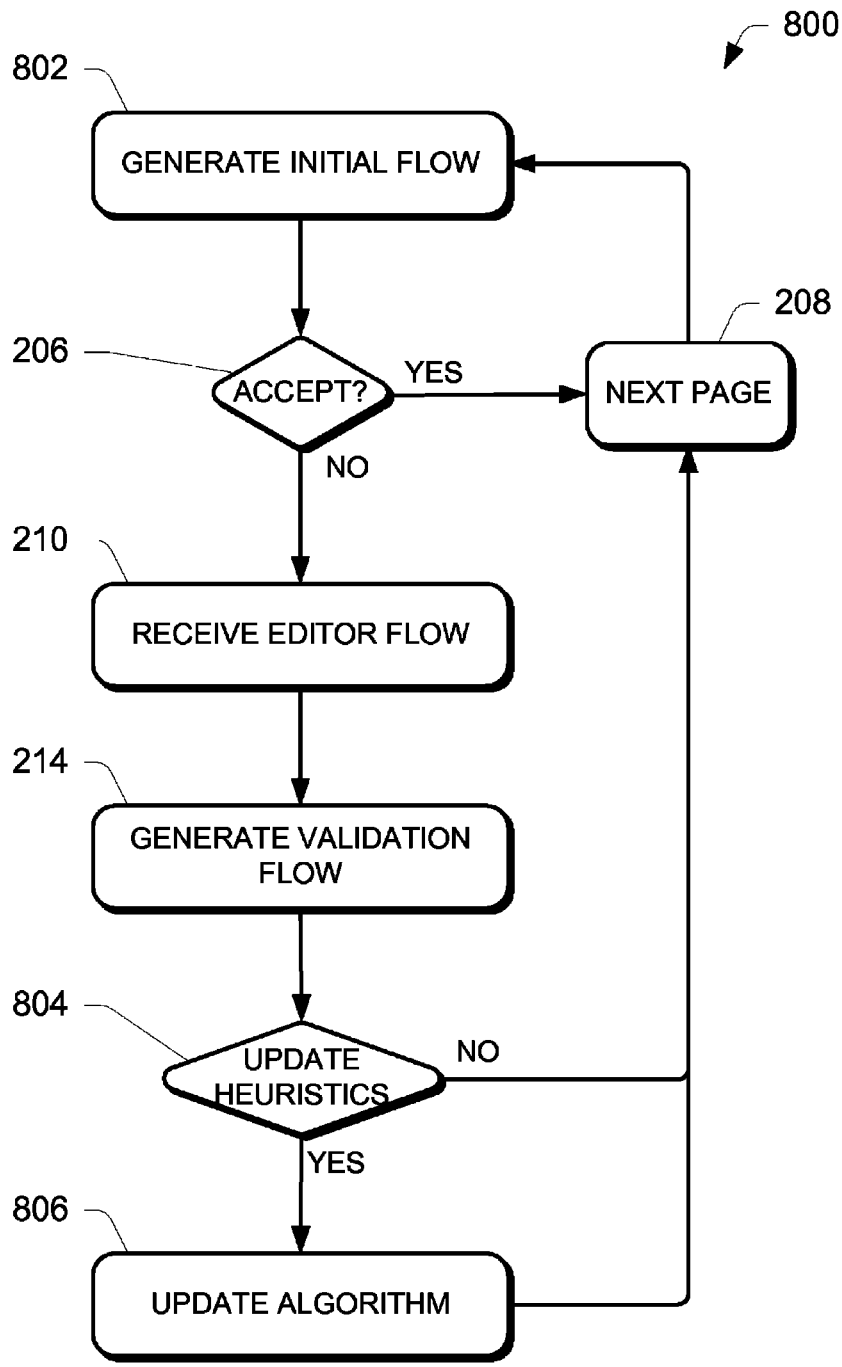
FIG. 8 is a flow diagram of an illustrative process of editing the order of objects of a page using one or more of the modules of FIG. 1B.

FIG. 8 shows an illustrative process 800 of editing the order of objects of a page using one or more of the modules of FIG. 1B. Many of the operations in the process 800 are similar to those in the process 200 described with reference to FIG. 2. Therefore, similar or identical operations of FIG. 8 will not be discussed in detail.

In accordance with embodiments, at 802, an initial flow may be created by the initial flow module 148. In some embodiments, the initial flow may include updated heuristics which may be generated by the update algorithm module 152 by analyzing input from the editor 108.

Continuing through the process 800, at 804, an update heuristics decision may be implemented after a validation flow is generated by the validation flow module 158. The update heuristics decision may proceed to updating the flow algorithm 150 at 806 if a criterion is satisfied. For example, the criterion may include a predetermined threshold number of inputs by the editor 108 to create heuristic data. In some embodiments, the heuristics data may enable an update of the flow algorithm 150 based on the editor input to create a more accurate initial flow, which is less likely to require the editor to trace the editor-assigned flow using the editor flow module 156. The heuristics may query historical editor input data to determine an adjustment in the flow algorithm 150 that results in a more accurate determination of the initial flow. For example, multi-column text may be incorrectly ordered by the initial flow module 148, whereas historical editor input data may used by the flow algorithm 150 to create an improved initial flow that is based, at least in part, on historical editing behavior received from the editor.

At 806, the update algorithm module 818 may analyze the heuristics data to update the flow algorithm 150 to make the initial flow more accurate, thus potentially resulting in an increase in acceptance (the operation 206) of the initial flow at 802.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method comprising:
generating a first flow of objects of a page using a flow algorithm, wherein the first flow indicates a sequential order of the objects;
visually representing the first flow on a display of a computing device for review by a human editor;
receiving a second flow of objects of the page created by the human editor designating points in the objects to indicate a sequential order of the objects;
visually representing the second flow on the display of the computing device, wherein the second flow passes through points on the objects designated by the human editor;
converting the second flow into a third flow of objects of the page,
visually representing the third flow on the display of the computing device for review by the human editor, wherein the third flow passes through at least one predetermined point on an object which is a different point than a point designated by the human editor in the second flow;
receiving an acceptance of the third flow by the human editor; and
ordering the objects based at least in part on the accepted third flow.

2. The computer-implemented method as recited in claim 1, wherein the first flow is visually represented on the display of the computing device by a reference curve.

3. The computer-implemented method as recited in claim 2, wherein the reference curve passes through each object.

4. The computer-implemented method as recited in claim 1, wherein receiving the second flow of objects of the page created by the human editor includes receiving input from at least one of a mouse or a touch screen input device of the computing device.

5. The computer-implemented method as recited in claim 1, further comprising displaying the second flow and the third flow as separate visual representations.

6. A non-transitory computer-readable medium having a computer-executable component, the computer-executable component comprising a user interface component configured to:
   cause a page to be displayed on a computing device, the page having a first layer including a plurality of objects arranged on the page, and a second layer including a plurality of reference curves, wherein the plurality of reference curves includes:
      a first reference curve, wherein the first reference curve is a visual representation of a first flow of objects on a page, wherein the first flow indicates an initial order in which the plurality of objects is arranged on the page,
      a second reference curve, wherein the second reference curve is a visual representation of a second flow of objects on the page, wherein the second reference curve is created by a human editor designating points in the plurality of objects to indicate an order of the plurality of objects on the page; and
      a third reference curve, wherein the third reference curve is a visual representation of a third flow of objects on the page, wherein the third reference curve is converted from the second reference curve and passes through at least one predetermined point of an object which is a different point than a point designated by the human editor; and
   rearrange the plurality of objects based at least in part on the third flow, following acceptance of the third flow by the human editor.

7. The non-transitory computer-readable medium as recited in claim 6, where the plurality of objects included in the first layer is rearranged based at least in part on the second flow to form a preview of ordered objects using animation.

8. The non-transitory computer-readable medium as recited in claim 6, wherein the second flow is received by the human editor inputting at least one of a trace through each of the plurality of objects using an input device or a sequential selection of each of the plurality of objects using an input device.

9. The non-transitory computer-readable medium as recited in claim 6, wherein the third reference curve connects each of the plurality of objects in the order of the second flow.

10. The non-transitory computer-readable medium as recited in claim 9, wherein the third reference curve is a best-fit curve through the plurality of objects.

11. The non-transitory computer-readable medium as recited in claim 6, wherein the plurality of objects included in the first layer includes objects of text obtained from an optical character recognition (OCR) device.

12. The non-transitory computer-readable medium method as recited in claim 6, wherein the first reference curve, the second reference curve, and the third reference curve are visually represented in the second layer independent of one another.

13. A system comprising:
   a processor; and
   a storage medium containing modules executable by the processor, the modules including:
      a first flow module that generates a first flow of objects of a page using a flow algorithm, wherein the first flow indicates an order of the objects;
      a second flow module that enables a human editor to edit the first flow of the objects of the page to create a second flow, wherein the second flow designates points in the objects to indicate an order of the objects;
      a third flow module that converts the second flow into a third flow, wherein the third flow passes through at least one predetermined point of an object that is a different than a point designated by the human editor; and
      a flow reordering module that reorders the objects based at least in part on the third flow, following acceptance of the third flow by the human editor.

14. The system as recited in claim 13, wherein the first flow of objects of a page is designated by a number associated with each object of the page, the number designating a sequential order of each object with respect to other objects of the page.

15. The system as recited in claim 13, wherein the second flow module receives input from the human editor to trace a curve through the objects in a corrected sequential order, thereby creating the second flow.

16. The system as recited in claim 15, wherein the third flow module creates a visual representation of the corrected sequential order of the objects to enable the human editor to confirm the second flow, the visual representation being separate from the traced curved received via the human editor.

17. The system as recited in claim 13, wherein the second flow module receives input from the human editor of sequential selections of objects in a corrected sequential order, thereby creating the second flow.

18. The system as recited in claim 13, wherein the second flow module displays a visual indicator that signals when an object has been assigned an order by the human editor.

19. A non-transitory computer-readable medium having a computer-executable component, the computer-executable component comprising a user interface component configured to:
   cause a page to be displayed, the page having:
      a plurality of objects having a sequential order,
      a first flow to connect each object in a first order to assign the sequential order to the plurality of objects,
      an ordering tool to enable a human editor to edit the first flow of the plurality of objects to create a second flow when the first flow is not a correct sequential order of the plurality of objects, wherein the second flow is created by the human editor designating points in the objects to indicate a correct sequential order of the plurality of objects,
      a validation tool to convert the second flow into a third flow, wherein the third flow passes through at least one predetermined point of an object which is a different point than a point designated by the human editor in the second flow, and
      a reordering tool to enable a reordering of the objects based at least in part on the third flow, following acceptance of the third flow by the human editor.

20. The non-transitory computer-readable medium as recited in claim 19, wherein the ordering tool displays a curve to represent the second flow.

21. The non-transitory computer-readable medium as recited in claim 19, wherein the human editor edits the first flow by use of at least one of a mouse, a stylus, or a touch-screen input.

22. The non-transitory computer-readable medium as recited in claim 19, wherein the first order is represented by assigning a number to each of the objects in a sequential pattern to convey the first order of the objects to the human editor.

23. A computer-implemented method comprising:

under control of one or more computing devices configured with specific computer-executable instructions, receiving a page of objects in an image-based file;

generating a first flow for the objects based at least in part on historical editing trends, wherein the first flow indicates an order of the objects on the page; and modifying the order of the objects based at least in part on a second flow received from a human editor, wherein modifying the order of the objects includes:

receiving a trace through the objects from the human editor, the trace having a start and an end and including designated points in the objects to indicate a modified order of the objects;

comparing the trace with a perimeter of the objects of the page; and ordering the objects based at least in part on an intersection of the trace and the perimeter in a sequential order from the start to the end of the trace;

converting the second flow to a third flow, wherein the third flow passes through at least one redetermined point of an object which is a different point than a designated point at least one predetermined point of an object which is a different point than a designated point in the second flow;

visually representing the third flow for review by the human editor, wherein the third flow represents a potentially different flow than the second flow;

receiving an acceptance of the third flow; and ordering the objects based at least in part on the third flow accepted by the human editor.

24. The computer-implemented method as recited in claim 23, wherein receiving a page of objects in an image-based file includes receiving a scanned page of content having objects of text.

25. The computer-implemented method as recited in claim 23, further comprising incrementally updating a counter after the second flow is received, and updating a calculation of the first flow based at least in part on historical editing trends after the counter reaches a predetermined threshold that reflects a requisite quantity of human editor input.

* * * * *

UNITED STATES PATENT AND TRADEMARK OFFICE
CERTIFICATE OF CORRECTION

| | | |
|---|---|---|
| PATENT NO. | : 8,572,480 B1 | Page 1 of 1 |
| APPLICATION NO. | : 12/241352 | |
| DATED | : October 29, 2013 | |
| INVENTOR(S) | : Robert L. Goodwin et al. | |

It is certified that error appears in the above-identified patent and that said Letters Patent is hereby corrected as shown below:

In the Claims

In column 16 at line 2, In Claim 23, change "redetermined" to --predetermined--.

Signed and Sealed this
Fourteenth Day of April, 2015

Michelle K. Lee
*Director of the United States Patent and Trademark Office*